United States Patent
Takeuchi et al.

[11] Patent Number: 5,851,729
[45] Date of Patent: *Dec. 22, 1998

[54] OPTICAL DISC

[75] Inventors: Atsushi Takeuchi; Shuichi Igarashi; Mikio Yoshida, all of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 703,792

[22] Filed: Aug. 27, 1996

[30] Foreign Application Priority Data

Aug. 31, 1995 [JP] Japan .................................. 7-224067
Aug. 31, 1995 [JP] Japan .................................. 7-224072

[51] Int. Cl.$^6$ .................................................... G11B 7/24
[52] U.S. Cl. .................... 430/270.12; 430/945; 369/288; 346/135.1
[58] Field of Search ................... 346/135.1; 369/288; 430/270.12, 945

[56] References Cited

U.S. PATENT DOCUMENTS

| | | | |
|---|---|---|---|
| 4,460,636 | 7/1984 | Watanabe | 430/945 |
| 4,587,533 | 5/1986 | Nakane et al. | 430/270.12 |
| 4,645,712 | 2/1987 | Ishigaki et al. | 346/135.1 |
| 4,725,502 | 2/1988 | Kiyomiya et al. | 369/288 |

FOREIGN PATENT DOCUMENTS 03-293193  12/1991  Japan .

*Primary Examiner*—Martin Angebranndt
*Attorney, Agent, or Firm*—Hill & Simpson

[57] ABSTRACT

An optical disc having, as a recording layer, a first Sb—Se based thin film, a Bi—Te based thin film and a second Sb—Se based thin film, deposited in this order on a disc substrate, and a thin Al film deposited on the recording layer, is disclosed. Each of the first Sb—Se thin film and the second Sb—Se thin film has a composition such that Se accounts for not less than 70 atm % of the composition. The film thicknesses of the first Sb—Se based thin film and the second Sb—Se based thin film are set to not larger than 30 nm and to 15 to 25 nm, respectively, with the reflectance of the recording layer with respect to the laser beam with a wavelength of 680 nm being 10 to 25%. Alternatively, the first Sb—Se based thin film is of $Sb_2Se_3$, the Bi—Te based thin film is of $Bi_2Te_3$ and the second Sb—Se based thin film is of $Sb_2Se_3$, and the film thickness of the second Sb—Se based thin film is set to 15 to 25 nm, so that the reflectance of the recording layer with respect to the laser beam with a wavelength of 680 nm will be 10 to 25%.

1 Claim, 3 Drawing Sheets

OPTICAL DISC

BACKGROUND OF THE INVENTION

1. Field of the Invention

This invention relates to an optical disc conforming to a write-once type memory configuration.

2. Description of the Related Art

Investigations, into the optical information recording system in the field of information recording are proceeding briskly. An optical information recording system has a number of merits, such as non-contact recording/reproduction, a recording density more than one digit of magnitude higher than that achieved with the magnetic recording system, and adaptability to the read only, write once or overwrite type memory configurations. Thus it is contemplated to use optical information recording systems in a wide range of applications, including the usages for industry and for household use, as a system for realization of inexpensive large-capacity files.

As an optical disc type conforming to the write-once memory configuration, there is such an optical disc in which a first $Sb_2Se_3$ thin film, a $Bi_2Te_3$ thin film and a second $Sb_2Se_3$ thin film, are layered in this order as a recording layer on a disc substrate of glass or plastics, and an Al thin film is further formed thereon.

With this optical disc, the heat of the laser beam is used for alloying for modifying the material composition, and the information is recorded by exploiting the difference in reflectance before and after such modification. Specifically, the laser beam is radiated on the optical disc for reacting a $Bi_2Te_3$ alloy with the $Sb_2Se_3$ alloy present on each of the upper and lower sides of the $Bi_2Te_3$ alloy for generating a quaternary alloy of the Bi—Te—Sb—Se system for modifying the reflectance.

For actually recording the information on this optical disc, a laser beam having a wavelength of 780 nm or 830 nm is employed. The optical disc is configured so that, by using the laser beam of the above wavelengths with a recording power on the order of 10 mW, the desired recording bit length can be obtained. The reflectance with the use of the laser beam with the wavelength of 780 nm is approximately 15%. This optical disc is referred to hereinafter as an optical disc for the current wavelength.

Foe achieving higher recording density of an optical disc, the simplest and easiest method is possibly to use a laser beam of a shorter wavelength. In order to cope with this demand, a laser beam with a wavelength of 680 nm is being put to practical utilization.

In particular, in the field of a magneto-optical disc (MO disc), development of a disc drive for performing recording/reproduction using a laser beam with a wavelength of 680 nm is proceeding. It is also desirable that recording/reproduction on or from the write-once optical disc can be done using a common disc drive as that for the MO disc. In a disc drive using a laser beam with the wavelength of 680 nm, sometimes referred to hereinafter as a drive for 680 nm, it is necessary that the recording power and the reflectance from the recording layer be set to 14 mW at the maximum and to 10 to 25%, respectively.

However, if recording is done on the above-mentioned optical disc for the current wavelength using a drive for 680 nm, recording sensitivity becomes insufficient with the ordinary recording power. For obtaining a recording pit length which could be achieved with the recording power of 10 mW with the MO disc, a recording power far surpassing 14 mW is required for recording on the optical disc for current wavelength. Such high recording power cannot be achieved with the ordinary drive for 680 nm.

The reflectance of approximately 15%, achieved with the use of a laser beam of the wavelength of 780 nm, is lowered to approximately 7% with the laser beam of the wavelength of 680 nm. In addition, the use of a shorter wavelength laser beam leads to deteriorated playback stability.

SUMMARY OF THE INVENTION

It is therefore an object of the present invention to provide an optical disc suited for high density recording and with which a variety of sorts of deterioration of characteristics can be prevented and high recording density can be achieved even if a shorter wavelength laser beam is employed for recording.

In one aspect, the present invention provides a write-once optical disc including a substrate, a recording layer arranged on said substrate and made up of a first Sb—Se based thin film, a Bi—Te based thin film and a second Sb—Se based thin film, layered in this order, and an Al thin film arranged on said recording layer. Each of the first Sb—Se based thin film and the second Sb—Se based thin film has a composition wherein Se accounts for not less than 70 atm %.

In another aspect, the present invention provides a write-once optical disc including a substrate, a recording layer arranged on the substrate and made up of a first $Sb_2Se_3$ based thin film, a $Bi_2Te_3$ based thin film and a second $Sb_2Se_3$ based thin film, layered in this order, and an Al thin film arranged on the recording layer. The first $Sb_2Se_3$ thin film has a film thickness of 15 to 25 nm, with the reflectance from the recording layer for a laser beam with a wavelength of approximately 680 nm being 10 to 25%.

DESCRIPTION OF THE PREFERRED EMBODIMENTS

An optical disc according to a first embodiment of the present invention is a write-once optical disc which can be used even if a shorter wavelength laser beam is used for recording.

Figure 1:
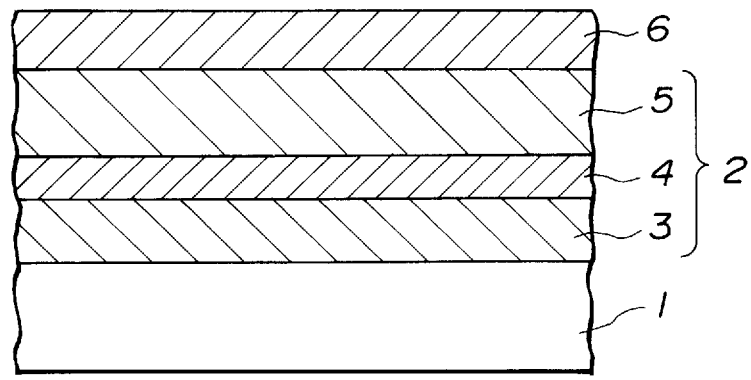
FIG. 1 is a schematic cross-sectional view showing an embodiment of an optical disc.

Specifically, the optical disc includes a disc substrate of polycarbonate 1, with a diameter of 300 mm, on which a first Sb—Se based thin film 3, a $Bi_2Te_3$ thin film 4 and a second Sb—Se based thin film 5, are deposited in this order, as a recording layer 2, and an Al thin film 6 is further deposited on the recording layer 2, as shown in FIG. 1.

The first Sb—Se based film 3, $Bi_2Te_3$ thin film, second Sb—Se based thin film 5 and the Al thin film 6 are formed in this order by sputtering to film thicknesses of 30 nm, 13 nm, 120 nm and 60 nm, respectively.

When forming the first Sb—Se based thin film 3 and the second Sb—Se based thin film 5, an Sb target and an Se target were used, and the sputtering power was controlled for the respective targets for providing the composition of 30 atm % of Sb and 70 atm % of Se.

On the above-described optical disc, the information was actually recorded using a laser beam with a wavelength of 680 nm. The information recording was by reacting the portion of the $Bi_2Te_3$ alloy irradiated with the laser beam with the Sb—Se based alloy present on each of the upper and lower sides of the $Bi_2Te_3$ alloy for generating a quaternary alloy of the Bi—Te—Sb—Se system for modifying the reflectance. In making the recording, the recording power required for producing the recording pit length of 280 nsec (optimum recording power) was 12.5 mW.

This result indicates that recording/reproduction can be performed on the optical disc of the present embodiment using a drive for 680 nm designed for performing recording/reproduction on the MO disc.

That is, with the composition of the optical disc of the present embodiment, in which the proportion of Se in the first Sb—Se thin film 3 and the second Sb—Se based thin film 5 is richer than with the stoichiometrically stable composition, the recording sensitivity is improved for coping with the tendency towards using a shorter wavelength laser beam.

The following experiments were conducted for checking an adequate range of the composition.

Experiment 1

Specifically, for checking how the recording sensitivity is changed with the composition of the first Sb—Se thin film 3 and the second Sb—Se based thin film 5, several optical discs having the same structure as described above except that the proportions of Sb and Se in each of the first $Sb_2Se_3$ thin film 3 and the second $Sb_2Se_3$ thin film 5 were set to 40 atm % to 60 atm % (equal to the proportions of the current wavelength optical disc), 37 atm % to 63 atm %, 30 atm % to 70 atm % and 20 atm % to 80 atm %, were provided, and recording was then made on these discs using the laser beam having the wavelength of 680 nm, in order to check the relation between the recording power and the recording pit length. The results are shown in FIG. 2, along with the results of measurement on the MO disc.

Figure 2:
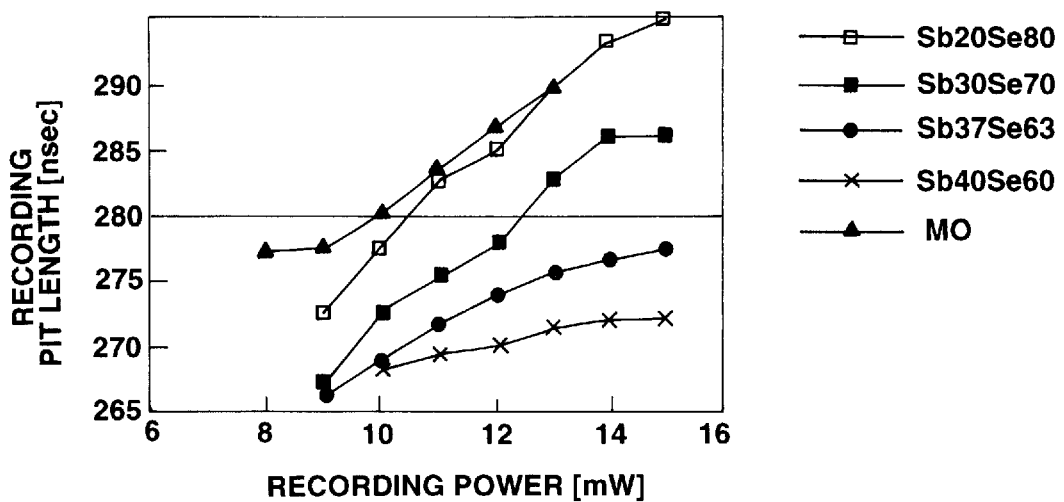
FIG. 2 is a graph showing the recording power and the recording bit length for variable proportions of the first Sb—Se based thin film 3 and the second Sb—Se based thin film 5.

It is seen from FIG. 2 that the higher the proportion of Se in the composition of the first Sb—Se based thin film 3 and the second Sb—Se based thin film 5, the smaller is the value of the recording power that is required for obtaining the recording pit length of 280 nsec, that is an optimum recording power. It is seen from the results of measurements that, for doing recording/reproduction by the drive for the MO disc, it is necessary for the proportion of Se in the composition of the first Sb—Se based thin film 3 and the second Sb—Se based thin film 5 to be not lower than 70 atm %.

With the optical disc having the proportion of Se of 70 atm % in the composition of the first Sb—Se based thin film 3 and the second Sb—Se based thin film 5, the film thickness of the first Sb—Se based thin film was reduced in order to check changes in the recording density. It was found that the thinner the film thickness of the first Sb—Se based thin film 3, the higher becomes the recording density, such that, if the film thickness was set to approximately 15 to 25 nm, the recording density comparable to that of the MO disc could be obtained.

It was found from the above results of the experiment that, for obtaining an optical disc not deteriorated in recording sensitivity even if the laser beam having the wavelength of 680 nm is used, it is advisable to set the proportion of Se in the composition of the first Sb—Se based thin film 3 and the second Sb—Se based thin film 5 so as to be 70 atm % or higher and that the thinner the film thickness of the first Sb—Se based thin film 3, the higher becomes the recording sensitivity.

In the optical disc according to the present invention, an addition element, such as Ge, may be contained in the composition of the first Sb—Se based thin film 3 and the second Sb—Se based thin film 5 for improving playback stability.

The disc substrate material having optical and mechanical properties comparable to those of a conventional optical disc, such as glass or plastics, may be used. The plastics that may be used may be enumerated by polyvinyl chloride, acrylic resin, polycarbonate or epoxy resin. With the present optical disc, the Al thin film may be coated with a UV curable resin.

As may be seen from the foregoing, it becomes possible with the present invention to prevent the recording sensitivity from being lowered and to cope with the tendency towards using a shorter wavelength of the recording laser beam.

The optical disc of a second embodiment of the present invention is a write-once optical disc that may be used in case the laser beam used for recording is of a wavelength of 680 nm.

Figure 3:
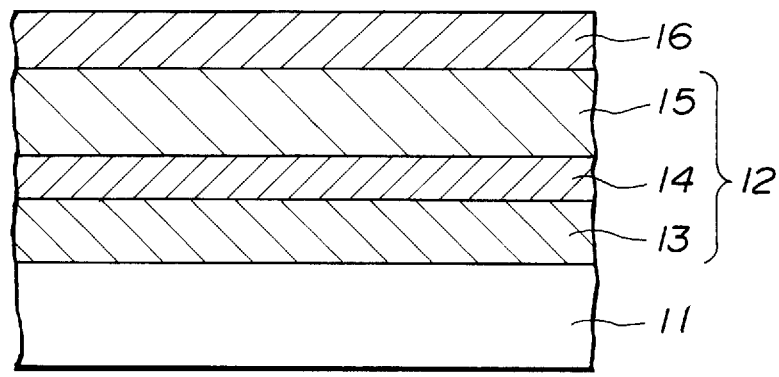
FIG. 3 is a schematic cross-sectional view showing an embodiment of an optical disc.

Specifically, this optical disc, formed of polycarbonate, has a disc substrate 11, with a diameter of 300 mm, on which a first $Sb_2Se_3$ based thin film 13, a $Bi_2Te_3$ thin film 14 and a second $Sb_2Se_3$ based thin film 15, are deposited in this order, as a recording layer 12, and an Al thin film 16 is further deposited on the recording layer 12, as shown in FIG. 3.

The first $Sb_2Se_3$ based thin film 13, $Bi_2Te_3$ thin film 14, second $Sb_2Se_3$ based thin film 15 and the Al thin film 16 are formed in this order by sputtering to film thicknesses of 20 nm, 15 nm, 130 nm and 100 nm, respectively.

The above-described optical disc was irradiated with a laser beam with a wavelength of 680 nm. The value of reflectance from the recording layer was 15%, which was on the same level as that when the laser beam with the wavelength of 780 nm is radiated on the optical disc for the current wavelength.

Using the laser beam with a wavelength of 680 nm, the information was actually recorded on the above-described optical disc. The information recording was by reacting the portion of the $Bi_2Te_3$ alloy irradiated with the laser beam with the Sb—Se based alloy present on each of the upper and lower sides of the $Bi_2Te_3$ alloy for generating a quaternary alloy of the Bi—Te—Sb—Se system for modifying the reflectance. In making the recording, the recording power required for producing the recording pit length of 280 nsec (optimum recording power) was 11.5 mW, which was of the same level as that of the optimum recording power in case of recording on the optical disc for the current wavelength using the laser beams of the wavelengths of 780 nm and 830 nm.

These results indicate that the drive for 680 nm for recording/reproduction on or from a MO disc can be used for recording reproduction on or from the optical disc of the present embodiment. Thus it has been found that, with the optical disc of the present embodiment, recording sensitivity can be prevented from being deteriorated even with the laser beam of a shorter wavelength.

Further, the information recorded on the above-mentioned optical disc was repeatedly read out with the readout power of 1.8 mW for measuring the lowering of the C/N ratio. It has now been found that, even although the readout power higher by about 50% than the usual readout power was used, the C/N ratio was lowered only by 2 dB or less from the initial C/N ratio after tens of hundreds of readout operations.

The above indicates that the optical disc of which the first $Sb_2Se_3$ thin film 13 is reduced in film thickness than with the optical disc for current wavelength is not deteriorated in various characteristics even with the use of laser beams of shorter wavelengths.

Several experiments were conducted for checking an optimum range of the film thickness of the first $Sb_2Se_3$ thin film 13.

Experiment 2

First, it was checked how recording sensitivity was changed with the film thickness of the first $Sb_2Se_3$ thin film 13. Specifically, optical disc samples having the same structure as that shown in Example 2 except that the film thicknesses of the first $Sb_2Se_3$ thin films 13 of the respective samples were set to 30 nm, 25 nm, 20 nm and to 15 nm. Recording was done on these samples using a laser beam with a wavelength of 680 nm in order to check the relation between the recording power and the recording pit length. The results are shown in FIG. 4.

Figure 4:
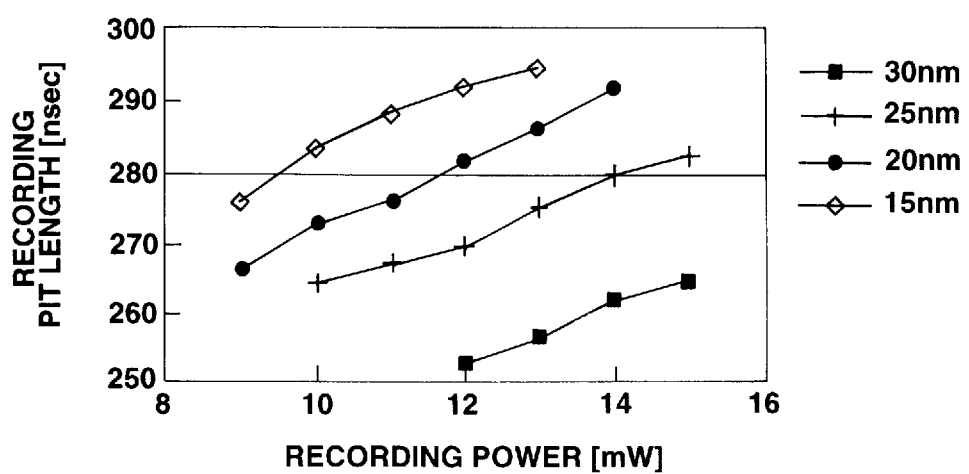
FIG. 4 is a graph showing the recording power and the recording bit length for variable film thickness of the first $Sb_2Se_3$ thin film.

It is seen from FIG. 4 that the thinner the film thickness of the first $Sb_2Se_3$ thin film 13, the smaller becomes the recording power that is needed for obtaining the recording pit length of 280 nsec. That is, the thinner the film thickness of the first $Sb_2Se_3$ thin film 13, the higher becomes the recording sensitivity. However, if the first $Sb_2Se_3$ thin film 13 is too small, the recording sensitivity is increased excessively, such that, if the usual recording power on the order of 10 mW is used for recording, the actually recorded pit length becomes longer than a desirable value.

Experiment 3

The relation between the film thickness of the first $Sb_2Se_3$ thin film 13 and the value of reflectance from the recording layer 12 for the wavelength of the radiated laser beam of 680 nm was checked. The results are shown in FIG. 5.

Figure 5:
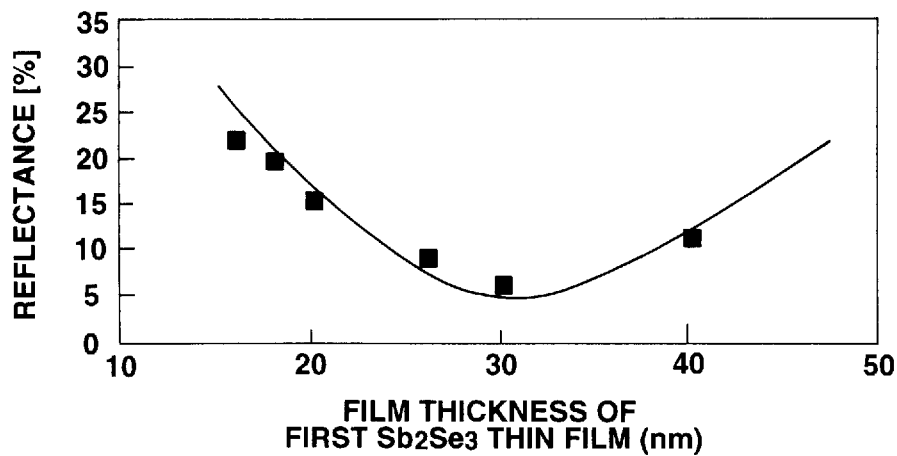
FIG. 5 is a graph showing the film thickness and reflectance of the first $Sb_2Se_3$ thin film and reflectance.

As may be seen from FIG. 5, the value of reflectance is lowest with the film thickness of the first $Sb_2Se_3$ thin film 13 of 30 nm, with the value of reflectance becoming higher with the film thickness larger or smaller than this value. However, if the film thickness of the first $Sb_2Se_3$ thin film 13 is too thick, the recording sensitivity is deteriorated, as explained previously. Thus it is desirable to reduce the film thickness of the first $Sb_2Se_3$ thin film 13 to smaller than 30 nm for improving reflectance. Also, taking into account the fact that the drive for 680 nm for recording/reproduction on or from the MO disc is designed for coping with the value of reflectance ranging from 10% to 25%, it may be seen that the film thickness of the first $Sb_2Se_3$ thin film 13 be in the range from 15 nm to 25 nm.

Experiment 4

First, it was checked how playback stability was changed with changes in the film thickness of the first $Sb_2Se_3$ thin film 13. Specifically, optical disc samples having the same structure as that shown in Example 1 except that the film thicknesses of the first $Sb_2Se_3$ thin films 13 of the respective samples were set to 26 nm, 20 nm and to 18 nm. Recording was done on these samples using a laser beam with a wavelength of 680 nm and the information was read out tens of hundreds of times using the readout power of 1.8 mW in order to check the lowering in the C/N ratio. The results are shown in FIG. 6.

Figure 6:
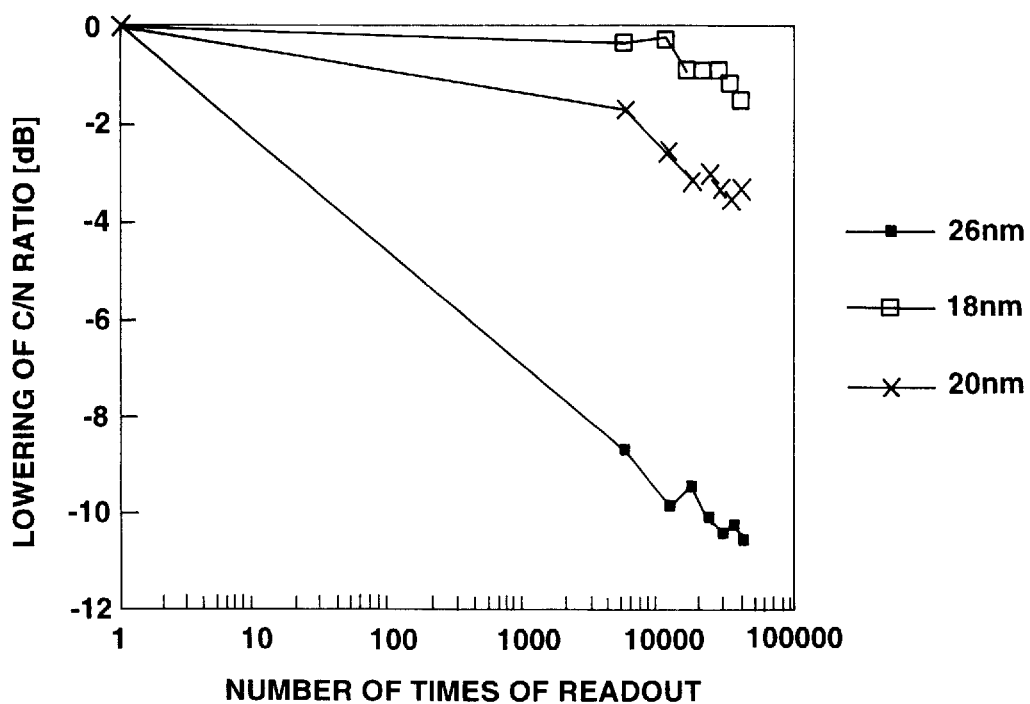
FIG. 6 is a graph showing the number of times of readout and the lowering of the C/N ratio for variable film thickness of the first $Sb_2Se_3$ thin film.

It is seen from FIG. 6 that, by diminishing the film thickness of the first $Sb_2Se_3$ thin film 13, the lowering in the C/N ratio can be suppressed after a large number of times of readout operations. It has now be seen from the results of the experiments 2 to 4 that, for realizing an optical disc that is not deteriorated in various characteristics even if the wavelength of the laser beam reduced to 680 nm, the film thickness of the first $Sb_2Se_3$ thin film 13 is desirably set to 15 nm to 25 nm.

As may be seen from the foregoing, it becomes possible with the present invention to prevent the recording sensitivity from being lowered and to cope with the tendency towards using a shorter wavelength of the recording laser beam.

We claim:

1. A write-once optical disc comprising:

a substrate having a surface;

a recording layer disposed on the surface comprising a first Sb—Se based thin film disposed on the surface having a thickness of from about 15 to about 25 nm and including 70 atomic % or more of Se, a $Bi_2Te_3$ based thin film on said first Sb—Se based thin film, and a second Sb—Se based thin film including 70 atomic % or more of Se disposed on said $Bi_2Te_3$ based thin film; and an Al thin film disposed on the recording layer, said write-once optical disc having a reflectance value from the recording layer for a laser beam of a wavelength of about 680 nm of from about 10 to about 25%, and said write-once optical disc producing a recording pit length of about 280 nsec at a recording power level of about 12.5 mW at said 680 nm wavelength.

* * * * *